United States Patent
Boysen et al.

(10) Patent No.: US 9,240,723 B2
(45) Date of Patent: Jan. 19, 2016

(54) RESONANT CIRCUIT AND RESONANT DC/DC CONVERTER

(75) Inventors: Kjetil Boysen, Flekkerøy (NO); Roar Myhre, Kristiansand (NO)

(73) Assignee: Eltek AS, Drammen (NO)

(*) Notice: Subject to any disclaimer, the term of this patent is extended or adjusted under 35 U.S.C. 154(b) by 439 days.

(21) Appl. No.: 13/516,357

(22) PCT Filed: Dec. 9, 2010

(86) PCT No.: PCT/NO2010/000453
§ 371 (c)(1),
(2), (4) Date: Aug. 9, 2012

(87) PCT Pub. No.: WO2011/074976
PCT Pub. Date: Jun. 23, 2011

(65) Prior Publication Data
US 2013/0201725 A1    Aug. 8, 2013

Related U.S. Application Data

(60) Provisional application No. 61/287,210, filed on Dec. 17, 2009.

(30) Foreign Application Priority Data

Dec. 17, 2009    (GB) .................................. 0922081.5

(51) Int. Cl.
*H02M 3/335* (2006.01)
*H02M 3/24* (2006.01)
(Continued)

(52) U.S. Cl.
CPC .............. *H02M 3/24* (2013.01); *H02M 3/3376* (2013.01); *H02M 2001/0058* (2013.01); *H02M 2003/1586* (2013.01); *Y02B 70/1425* (2013.01); *Y02B 70/1433* (2013.01); *Y02B 70/1491* (2013.01)

(58) Field of Classification Search
CPC ................ H02M 3/3376; H02M 3/02; H02M 2003/1586
USPC ...................................... 363/21.02, 21.03, 97
See application file for complete search history.

(56) References Cited

U.S. PATENT DOCUMENTS 7,830,685 B2 *  11/2010  Wagner et al. .................. 363/65
2008/0012538 A1 *  1/2008  Stewart et al. .................. 322/89

(Continued)

FOREIGN PATENT DOCUMENTS

DE      35 23 622 A1   1/1986
EP      2 299 580 A2   3/2011

(Continued)

OTHER PUBLICATIONS

Kaplan, Wiley Electrical and Electronics Dictionary, 2004, p. 178 "delta circuit".*

(Continued)

*Primary Examiner* — Gary L Laxton
*Assistant Examiner* — Kyle J Moody
(74) *Attorney, Agent, or Firm* — Osha Liang LLP

(57) ABSTRACT

A resonant circuit includes three resonant circuit input nodes and three output nodes and a transformer device having three primary windings and three secondary windings. The three primary windings are magnetically connected to the three secondary windings. The resonant circuit also includes a first resonant tank device, a second resonant tank device, and a third resonant tank device each connected between the respective first, second, and third resonant circuit input nodes and the respective first, second, and third primary windings.

10 Claims, 9 Drawing Sheets

(51) Int. Cl.
*H02M 3/337* (2006.01)
*H02M 3/158* (2006.01)
*H02M 1/00* (2007.01)

(56) References Cited

U.S. PATENT DOCUMENTS

| | | | |
|---|---|---|---|
| 2008/0298093 A1* | 12/2008 | Jin et al. | 363/21.06 |
| 2010/0220505 A1* | 9/2010 | Tsuruya | 363/25 |
| 2010/0314947 A1* | 12/2010 | Baarman et al. | 307/104 |
| 2010/0328968 A1* | 12/2010 | Adragna et al. | 363/21.02 |
| 2012/0320638 A1* | 12/2012 | Boysen et al. | 363/21.02 |
| 2013/0201725 A1 | 8/2013 | Boysen et al. | |

FOREIGN PATENT DOCUMENTS

| | | | |
|---|---|---|---|
| JP | 57003112 A | | 1/1982 |
| JP | 07039152 A | | 2/1995 |
| JP | WO2009078305 | * | 6/2009 |
| WO | 2006/123905 A1 | | 11/2006 |
| WO | 2009/078305 A1 | | 6/2009 |

OTHER PUBLICATIONS

International Preliminary Report on Patentability for International Application No. PCT/NO2010/000453 mailed Sep. 25, 2012 (8 pages).
A. K. S. Bhat et al., "A Three-Phase Series-Parallel Resonant Converter-Analysis, Design, Simulation, and Experimental Results," IEEE Transactions on Industry Applications, vol. 32, No. 4, Jul./Aug. 1996, XP008021502 (10 pages).
G. Drummond, "Three-Phase Resonant DC converter for TWTs," Vacuum Electronics Conference, 2004. IVEC 2004. Fifth IEEE International AL, Monterey, CA; Apr. 27-29, 2004; Piscataway, NJ; IEEE Apr. 27, 2004, p. 274 (1 page).
International Search Report issued in PCT/NO2010/000453, mailed Jan. 26, 2012 (4 pages).
Written Opinion issued in PCT/NO2010/000453, mailed Jan. 26, 2012 (6 pages).
Combined Search and Examination Report issued in corresponding Application No. GB0922081.5 mailed Apr. 19, 2010 (5 pages).
Office Action in a related U.S. Appl. No. 13/516,375 issued Jul. 15, 2014 (14 pages).
Office Action issued in counterpart European Patent Application No. 10 796507.1 dated Mar. 17, 2015 (8 pages).
G. A. Covic et al., "A Three-Phase Inductive Power Transfer System for Roadway-Powered Vehicles," IEEE Transactions on Industry Applications, XP011197367, vol. 54, No. 6, pp. 3370-3378, Dec. 1, 2007 (9 pages).
Juergen Biela et al., "Using Transformer Parasitics for Resonant Converters—A Review of the Calculation of the Stray Capacitance of Transformers," IEEE Transactions on Industry Applications, XP011200514, vol. 44, No. 1, pp. 223-233, Jan. 1, 2008 (11 pages).

* cited by examiner

RESONANT CIRCUIT AND RESONANT DC/DC CONVERTER

CROSS-REFERENCE TO RELATED APPLICATIONS

This application is a National Stage application of International Patent Application No. PCT/NO2010/000453, filed on Dec. 9, 2010, which claims priority pursuant to United Kingdom Patent Application No. 0922081.5, filed on Dec. 17, 2009, and U.S. Provisional Application No. 61/287,210, filed Dec. 17, 2009. International Patent Application No. PCT/NO2010/000453, United Kingdom Patent Application No. 0922081.5, and U.S. Provisional Application No. 61/287,210 are hereby incorporated by reference in their entirety.

FIELD OF THE INVENTION

The present invention relates to a resonant circuit and a resonant DC/DC converter.

BACKGROUND OF THE INVENTION

High efficiency galvanic isolation is needed in many power electronic applications. Transformer based isolation may be needed due to safety, change of voltage levels, or functional issues. Some renewable energy sources need galvanic isolation to work properly; among them are different types of thin film solar panels.

A solar cell panel generates DC power. To supply the DC power to an AC load, either directly or via an AC power distribution network, a power converter system must be connected between the solar cell panel and the AC load for converting the DC power to AC power. Such power converter systems normally comprise a DC/DC converter and a DC/AC converter, the DC/AC converter normally being referred to as an inverter. In addition, the system comprises a control system for controlling the converters, and other components such as filters, fuses, cooling systems etc.

The DC output power generated by a solar cell panel is changing with sun intensity and temperature. High conversion efficiency is very important to maximize energy harvest from a solar plant in the context of making the investment profitable.

The series resonant LLC DC/DC converter has become a popular alternative to PWM type converters in many applications. One advantage with the resonant converter is that it can be designed for high efficiency for all load and input/output voltage conditions since it can maintain zero-voltage switching for all operating conditions.

The practical limitation for a single resonant LLC converter is set by the increasing size and cost of the resonant inductor as the output power increases. Therefore, high power DC/DC-converters are provided as many smaller series resonant LLC converters in parallel, which increase the cost considerably due to the number of components.

The object of the present invention is to provide a resonant circuit with high efficiency and low cost, and which has high efficiency for a wide input voltage range. Moreover, the object is to reduce the number of components, and thereby reducing the complexity and costs involved. In addition, it is an object of the invention to reduce the ripple currents generated by the converter.

The object of the invention is also to provide a resonant DC/DC converter with such a resonant circuit.

SUMMARY OF THE INVENTION

The present invention relates to a resonant circuit comprising a three resonant circuit input nodes and three resonant circuit output nodes; a transformer device comprising three primary windings and three secondary windings magnetically connected to each other, where the three secondary windings are connected to the three resonant circuit output nodes; first, second and third resonant tank devices each connected between the respective three resonant circuit input nodes and the respective primary windings, where the three primary windings together with the three resonant tank devices are configured in a delta-configuration.

In one aspect each resonant tank device comprises a resonant inductor and a resonant capacitor.

In one aspect the circuit further comprises first, second and third transformer switching devices for reconfiguring the three secondary windings between a delta-configuration and a star-configuration.

In one aspect, the first transformer switching device comprises a common terminal connected to second terminal of the second transformer switching device, a first terminal connected to the first resonant output node and a second terminal connected to the common terminal of the third transformer switching device; the second transformer switching device comprises a common terminal connected to second terminal of the third transformer switching device, a first terminal connected to the second resonant circuit output node and a second terminal connected to the common terminal of the first transformer switching device; the third transformer switching device comprises the common terminal connected the second terminal of the first transformer switching device, a first terminal connected to the third resonant circuit output node and a second terminal connected to the common terminal of the second transformer switching device; where the first secondary winding is connected between the first and second terminals of the first transformer switching device, the second secondary winding is connected between the first and second terminals of the second transformer switching device and the third secondary winding is connected between the first and second terminals of the third transformer switching device, where the transformer device is connected in a delta-configuration when the first terminals of the respective transformer switching devices are connected to their common terminal and where the transformer device is connected in a star-configuration when the second terminals of the respective transformer switching devices are connected to their common terminals.

In one aspect the first resonant inductor, the first resonant capacitor and the first primary winding are connected in series between the first resonant circuit input node and the third resonant circuit input node; the second resonant inductor, the second resonant capacitor and the second primary winding are connected in series between the second resonant circuit input node and the first resonant circuit input node; and the third resonant inductor, the third resonant capacitor and the third primary winding are connected in series between the third resonant circuit input node and the second resonant circuit input node.

In one aspect a magnetic inductor is connected in parallel with each of the primary windings.

The present invention also relates to a resonant DC-DC converter comprises first and second input terminals and first and second output terminals; a switching device connected between the first and second input terminals and three resonant circuit input nodes of a resonant circuit; a rectifier device connected between three resonant circuit output nodes and the first and second output terminals; where the resonant circuit comprises a transformer device comprising three primary windings and three secondary windings magnetically connected to each other, where the three secondary windings are connected to the three resonant circuit output nodes; where the resonant circuit comprises first, second and third resonant tank devices each connected between the respective three resonant circuit input nodes and the respective primary windings, and where the three primary windings together with the three resonant tank devices are configured in a delta-configuration.

In one aspect, each resonant tank device comprises a resonant inductor and a resonant capacitor.

In one aspect the resonant tank device further comprises first, second and third transformer switching devices for reconfiguring the three secondary windings between a delta-configuration and a star-configuration.

In one aspect the switching device comprises six switching devices, where each switching device is connected between one of the first or second input terminals and one of the respective switch output nodes.

In one aspect the rectifier device is a diode rectifier or a synchronous rectifier.

DETAILED DESCRIPTION

In the following, embodiments of the invention will be described with reference to the enclosed drawings, where:

Figure 1:
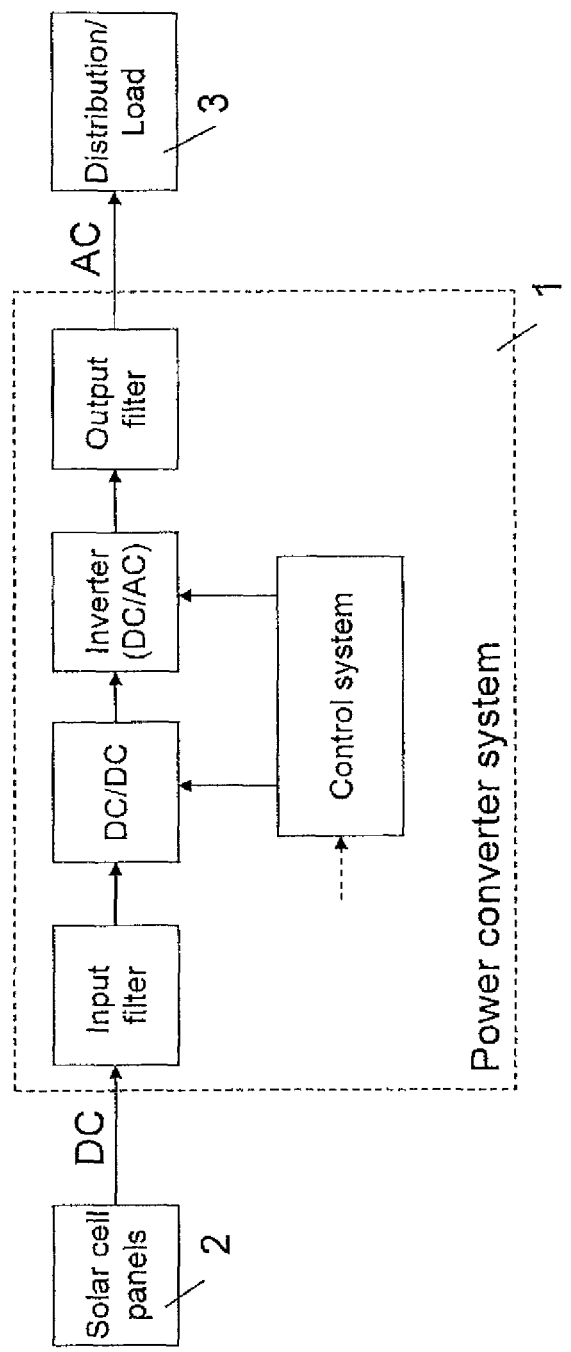
FIG. 1 illustrates a power converter system for converting DC power from a solar cell panel to AC power supplied to an AC power distribution network or an AC load.

It is now referred to FIG. 1. A power converter system 1 is connected between a DC power source 2 and an AC load or AC distribution network 3. The DC power source is here a solar cell panel or a module comprising several solar cell panels, but can be any other type of suitable energy source.

The power converter system converts the input DC power to an AC output power. The power converter system comprises a DC/DC converter and an inverter (DC/AC converter), filters etc as mentioned in the description above. Moreover, the system comprises a control system for controlling the DC/DC converter, the inverter and other components. The system in FIG. 1 is in general known for a skilled person.

Figure 2:
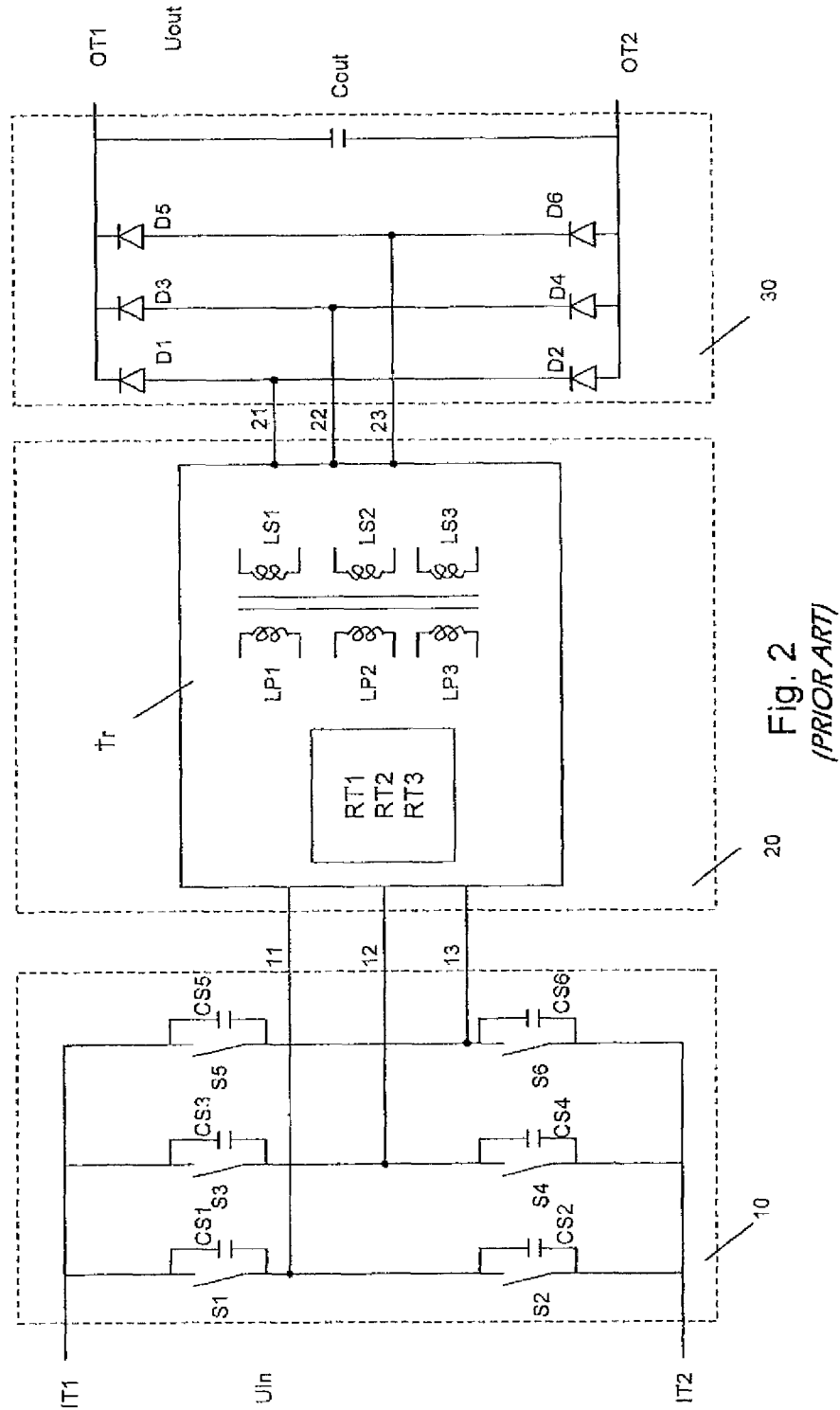
FIG. 2 is a schematic block diagram of the DC/DC converter of FIG. 1.

The present invention relates to the DC/DC converter in FIG. 1. It is now referred to FIG. 2. FIG. 2 illustrates a resonant DC/DC converter comprising a switching device 10, a resonant circuit 20 and a rectifier 30 connected to each other between first and second input terminals IT1, IT2 and first and second output terminals OT1, OT2.

The switching device 10 comprises six switches S1, S2, S3, S4, S5, S6, where each switch is connected between one of the first or second input terminals IT1, IT2 and one of the respective input nodes of the resonant circuit, hereinafter referred to as resonant circuit input nodes 11, 12, 13.

The first switch S1 is connected between the first input terminal IT1 and the first switch output terminal 11, a second switch S2 is connected between the first switch output node 11 and the second input terminal IT2, a third switch S3 is connected between the first input terminal IT1 and the second switch output terminal 12, a fourth switch S4 is connected between the second switch output node 12 and the second input terminal 1T2, a fifth switch S5 is connected between the first input terminal IT1 and the third switch output terminal 13 and a sixth switch S6 is connected between the third switch output node 13 and the second input terminal 1T2. The switches S1, S2, S3, S4, S5, and S6 are MOSFET switches. Alternatively, the switches may be switches with intrinsic diodes or switches connected in parallel with anti-parallel diodes.

The switching device 10 further comprises switch capacitors CS1, CS2, CS3, CS4, CS5 and CS6, each connected in parallel with one of the respective switches S1, S2, S3, S4, S5, S6.

The switches S1, S2, S3, S4, S5, and S6 are controlled by the control system illustrated in FIG. 1. It should be noted that the switches S1-S6 can be controlled by frequency, PWM, or as a hybrid of both of these.

As mentioned above, the resonant circuit 20 comprises three resonant circuit input nodes 11, 12, 13. The resonant circuit 20 also comprises three resonant circuit output nodes 21, 22, 23.

The rectifier device 30 is connected between the three resonant circuit output nodes 21, 22, 23 and the first and second output terminals OT1, OT2. The rectifier device 30 of FIG. 2 is a diode rectifier.

The rectifier device 30 of FIG. 2 comprises a first diode D1 with its anode connected to the first rectifier input node 21 and its cathode connected to the first output terminal OT1, a second diode D2 with its anode connected to the second output terminal OT2 and its cathode connected to the first rectifier input node 21, a third diode D3 with its anode connected to the second rectifier input node 22 and its cathode connected to the first output terminal OT1, a fourth diode D4 with its anode connected to the second output terminal OT2 and its cathode connected to the second rectifier input node 22, a fifth diode D5 with its anode connected to the third rectifier input node 23 and its cathode connected to the first output terminal OT1 and a sixth diode D6 with its anode connected to the second output terminal OT2 and its cathode connected to the third rectifier input node 23.

Alternatively, the rectifier device 30 may be a synchronous rectifier.

In FIG. 2, it is shown that an output capacitor Cout is connected between the first and second output terminals OT1, OT2.

It should be noted that the switching device 10 and the rectifier device 30 are considered known for a skilled person. Also the control of the switches in the switching device 10 is considered known for a skilled person. The control of the switches is based on soft switching or so-called zero voltage switching (ZVS), where the voltage over the switch is equal to or near zero V when the switch is turned on/off.

The resonant circuit 20 according to the invention will now be described with reference to FIG. 2. The resonant circuit comprises a transformer device TR comprising three primary windings LP1, LP2, LP3 and three secondary windings LS1, LS2, LS3 magnetically connected to each other, where the three secondary windings LS1, LS2, LS3 are connected to the three resonant circuit output nodes 21, 22, 23. Moreover, the resonant circuit 20 comprises first, second and third resonant tank devices RT1, RT2, RT3 each connected between the respective three resonant circuit input nodes 11, 12, 13 and the respective primary windings LP1, LP2, LP3.

The transformer device TR may be a three phase transformer. In an alternative embodiment, also three single phased transformers may be used. The primary windings LP1, LP2, LP3 may be configured in a delta-configuration. More precisely, the three primary windings LP1, LP2, LP3 together with the three resonant tank devices RT1, RT2, RT3 are configured in a delta-configuration, as will be described in detail below. The secondary windings LS1, LS2, LS3 may be configured in a delta-configuration or in a star-configuration.

As will be described below, the resonant circuit 20 may comprise first, second and third transformer switching devices ST1, ST2, ST3 for reconfiguring the three secondary windings LS1, LS2, LS3 between a delta-configuration and a star-configuration. The transformer switching devices ST1, ST2, ST3 may be controlled by the control system.

Each resonant tank device RT1, RT2, RT3 comprises a resonant inductor LR1, LR2, LR3 and a resonant capacitor CR1, CR2, CR3. The resonant tank device, together with the primary windings LP1, LP2, LP3 provides resonance for the zero-voltage switching of the switching device 10. The resonant tank devices may be partially or fully integrated in the transformer device, utilizing the leakage inductance and other parasitic elements.

The voltage between the first and second input terminals IT1 and 1T2 is referred to as Uin. The voltage between the first and second output terminals OT1 and OT2 is referred to as Uout.

It should be noted that the voltage and/or current in each of the three branches of the resonant device 20 has the same magnitude, but are displaced in time by 120 electrical degrees. Consequently, the device 20 together with devices 10 and 30 are a three phase resonant DC/DC converter.

It should also be noted that during ordinary operation, the voltages over the primary/secondary windings of the transformer device has a rectangular waveform switched at high frequency. Hence, these voltages are not 50/60 Hz sine wave voltages.

First Embodiment

Figure 3:
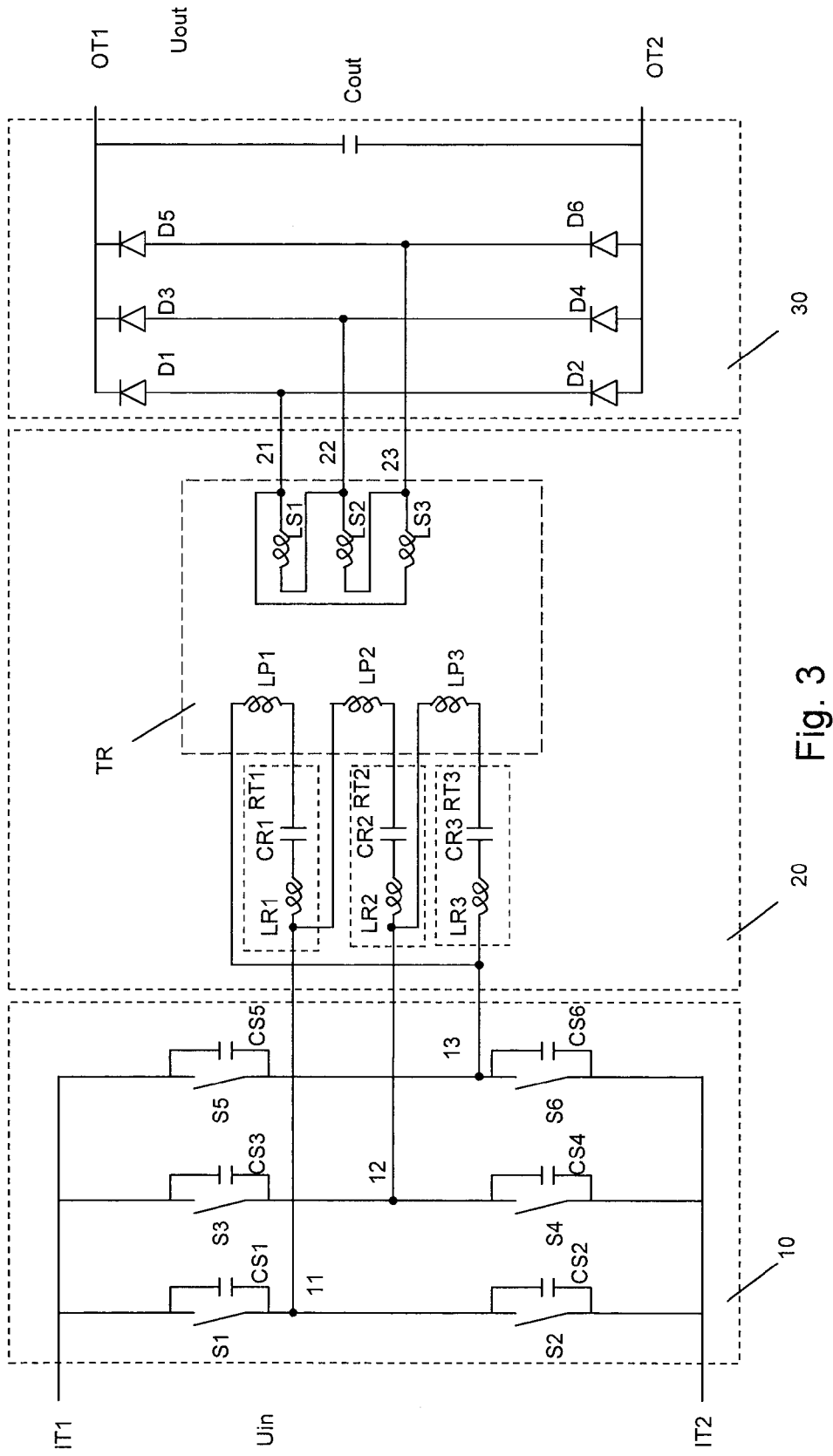
FIG. 3 is a first embodiment of a resonant DC/DC converter.

It is now referred to FIG. 3. Here, the first resonant tank device RT1 comprises the first resonant inductor LR1 and the first resonant capacitor CR1 connected in series with the first primary winding LP1 between the first resonant circuit input node 11 and the third resonant circuit input node 13. The second resonant tank device RT2 comprises the second resonant inductor LR2 and the second resonant capacitor CR2 connected in series with the second primary winding LP2 between the second resonant circuit input node 12 and the first resonant circuit input node 11. The third resonant tank device RT3 comprises the third resonant inductor LR3 and the third resonant capacitor CR3 connected in series with the third primary winding LP3 between the third resonant circuit input node 13 and the second resonant circuit input node 12.

The secondary windings LS1, LS2, LS3 are connected between the resonant circuit output nodes 21, 22, 23. The first secondary winding LS1 is connected between the first and second rectifier input nodes 21, 22, the second secondary winding LS2 is connected between the second and third rectifier input nodes 22, 23 and the third secondary winding LS3 is connected between the third and first rectifier input nodes 23, 21.

Consequently, the primary side of the transformer device TR is connected in a delta-configuration and the secondary side of the transformer device TR is connected in a delta-configuration. It should be noted that the term "primary side" here denotes the primary windings and the components of the resonant tank. Hence, the three primary windings LP1, LP2, LP3 together with the three resonant tank devices RT1, RT2, RT3 are configured in a delta-configuration.

It should be noted that also here the resonant tank devices may be partially or fully integrated in the transformer device, as described above.

Second Embodiment

Figure 4:
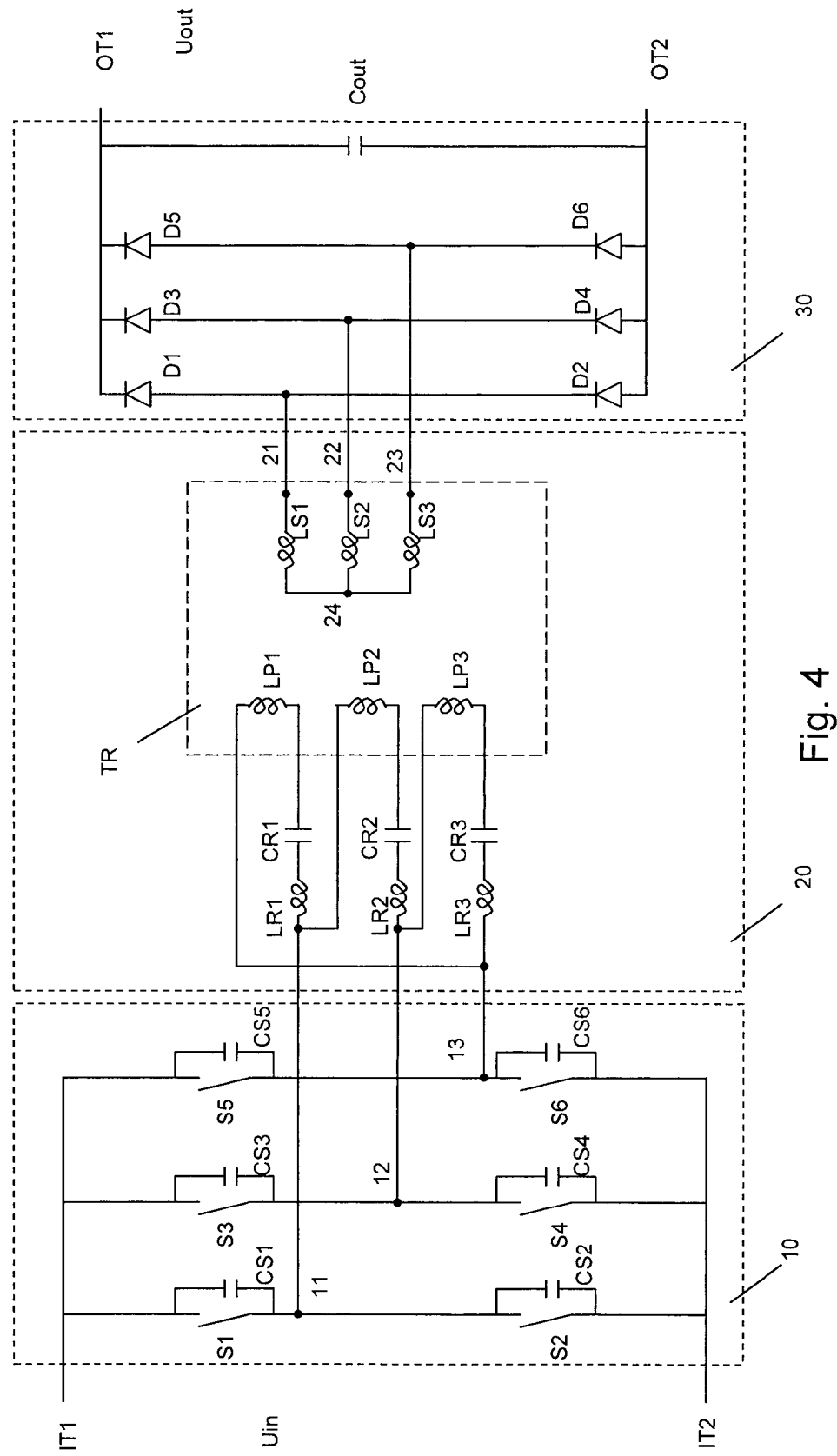
FIG. 4 is a second embodiment of a resonant DC/DC converter.

It is now referred to FIG. 4.

Here, the resonant tank devices and the primary side of the transformer device are configured as in the first embodiment above.

The secondary windings are here also connected between the resonant circuit output nodes 21, 22, 23. A secondary common node 24 is shown in the FIG. 4. The first secondary winding LS1 is connected between the first resonant circuit output node 21 and the secondary common node 24. The second secondary winding LS2 is connected between the second resonant circuit output node 22 and the secondary common node 24. The third secondary winding LS3 is connected between the third resonant circuit output node 23 and the secondary common node 24.

Consequently, the primary side of the transformer device TR is connected in a delta-configuration and the secondary side of the transformer device TR is connected in a star-configuration. It should be noted that the term "primary side" here denotes the primary windings and the components of the resonant tank. Hence, the three primary windings LP1, LP2, LP3 together with the three resonant tank devices RT1, RT2, RT3 are configured in a delta-configuration.

The secondary common node 24 may be considered as the common point of the star-configured transformer. Note that the term "secondary" is here used to denote the location on the secondary side of the transformer device.

Also here it should be noted that the resonant tank devices may be partially or fully integrated in the transformer device.

Third Embodiment

Figures 5A, 5B:
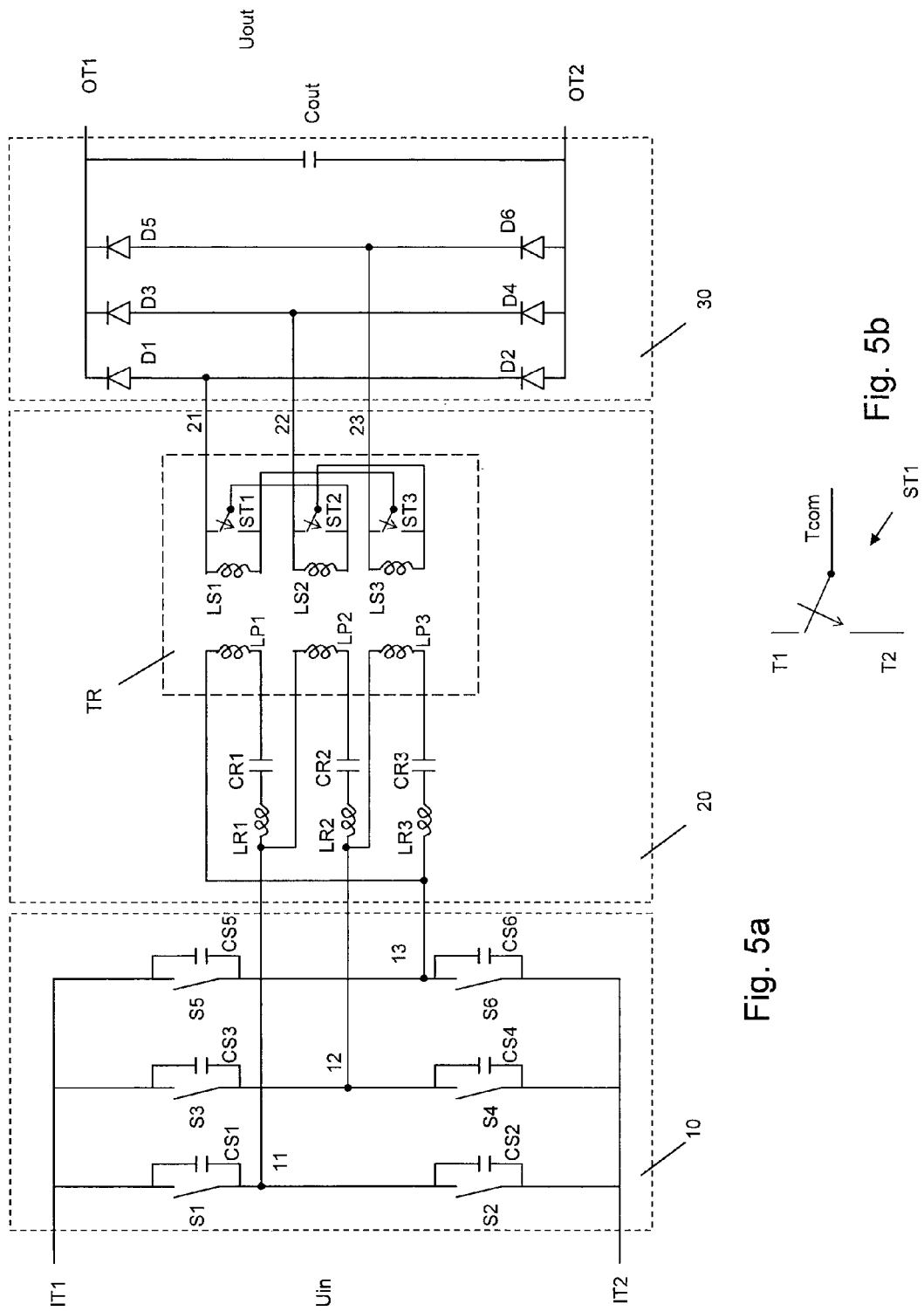
FIG. 5 is a third embodiment of a resonant DC/DC converter.

It is now referred to FIG. 5a and FIG. 5b.

Here, the resonant tank devices and the primary side of the transformer device are configured as in the first embodiment above.

The secondary windings are here also connected between the resonant circuit output nodes 21, 22, 23. However, here the resonant circuit 20 comprises first, second and third transformer switching devices ST1, ST2, ST3 for reconfiguring the three secondary windings LS1, LS2, LS3 between a delta-configuration and a star-configuration. The terminology of the first transformer switching device ST1 is shown in FIG. 5b. The switching of the transformer switching devices ST1, ST2, ST3 may be performed by means of relay devices, or any other switching devices, controlled by the control system.

The first transformer switching device ST1 comprises a common terminal Tcom connected to a second terminal T2 of the second transformer switching device ST2, a first terminal T1 connected to the first resonant circuit output node 21 and a second terminal T2 connected to the common terminal Tcom of the third transformer switching device ST3.

The second transformer switching device ST2 comprises a common terminal Tcom connected to a second terminal T2 of the third transformer switching device ST3, a first terminal T1 connected to the second resonant circuit output node 22 and a second terminal T2 connected to the common terminal Tcom of the first transformer switching device ST1.

The third transformer switching device ST3 comprises the common terminal Tcom connected the second terminal T2 of the first transformer switching device ST1, a first terminal T1 connected to the third resonant circuit output node 23 and a second terminal T2 connected to the common terminal Tcom of the second transformer switching device ST2.

The first secondary winding LS1 is connected between the first and second terminals T1, T2 of the first transformer switching device ST1, the second secondary winding LS2 is connected between the first and second terminals T1, T2 of the second transformer switching device ST2 and the third secondary winding LS3 is connected between the first and second terminals T1, T2 of the third transformer switching device ST3.

The transformer device TR is connected in a delta-delta configuration when the first terminals T1 of the respective transformer switching devices are connected to their common terminal Tcom. The transformer device TR is connected in a delta-star configuration when the second terminals T2 of the respective transformer switching devices are connected to their common terminals Team.

The transformer switching devices ST1, ST2, ST3 are be controlled by the control system. For example, the input voltage Uin may be measured and given as an input to the control system. If the measured input voltage Uin is below a certain threshold value, the transformer switching devices ST1, ST2, ST3 is switched so that the secondary side of the transformer device is connected in a star configuration. If the measured input voltage Uin is above a certain threshold value, the transformer switching devices ST1, ST2, ST3 is switched so that the secondary side of the transformer device is connected in a delta-configuration. Consequently, the output voltage Uout decreases.

Fourth Embodiment

Figure 6:
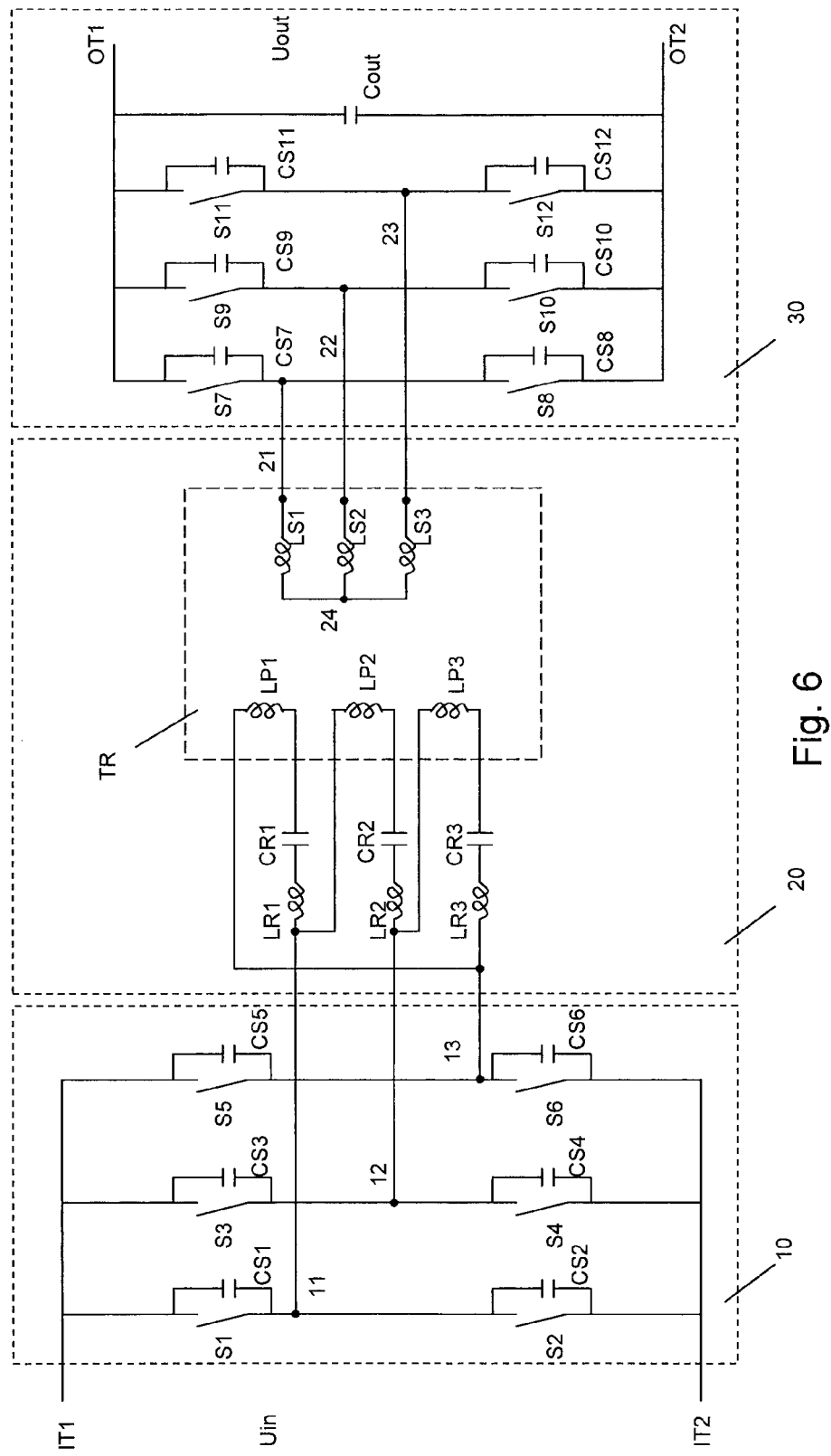
FIG. 6 is a fourth embodiment of a resonant DC/DC converter.

It is now referred to FIG. 6.

The resonant circuit 20 is here similar to the resonant circuit 20 of the second embodiment (FIG. 4).

Here, the rectifier device 30 is not a diode rectifier. Instead, the rectifier device 30 is a synchronous rectifier with six switches S7, S8, S9, S10, S11, S12 instead of the six diodes. The rectifier device comprises six switch capacitors CS7, CS5, CS9, CS10, CS11 and CS12 each connected in parallel to one of the six switches.

Also these switches are MOSFET switches. Alternatively, the switches may be switches with intrinsic diodes or switches connected in parallel with anti-parallel diodes.

It should be noted that this type of rectifier device 30 may be used for any of the above embodiments and any of the embodiments below. Moreover, it may be used for any configuration of the transformer device (delta-delta, delta-star).

It should be also be noted that with this type of rectifier device, it would be possible to achieve bidirectional power flow, i.e. power may flow from input terminals to output terminals, but also from output terminals to input terminals as defined in FIG. 6. This type of converter is normally referred to as a bidirectional dc-dc converter.

Fifth Embodiment

Figure 7:
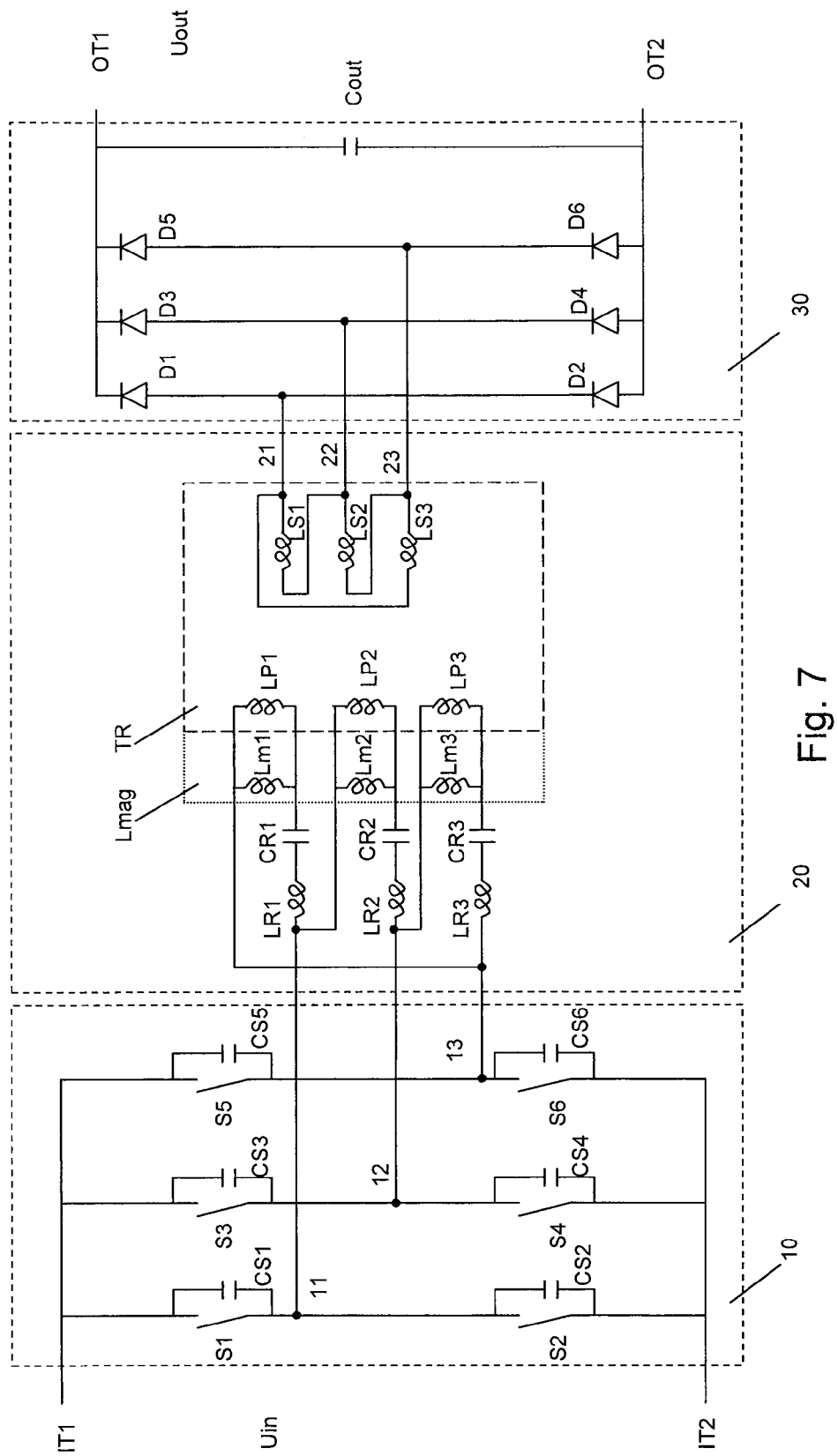
FIG. 7 is a fifth embodiment of a resonant DC/DC converter.

It is now referred to FIG. 7. The resonant circuit 20 is here similar to the resonant circuit of FIG. 6 and FIG. 4. Here, the resonant circuit 20 further comprises one magnetizing inductor Lm1, Lm2, Lm3 connected in parallel with each of the primary windings LP1, LP2, LP3.

A first magnetizing inductor Lm1 is connected in parallel with the first primary winding LP1. A second magnetizing inductor Lm2 is connected in parallel with the second primary winding LP2. A third magnetizing inductor Lm3 is connected in parallel with the third primary winding LP3. The magnetizing inductor will influence on the resonance of the resonant circuit.

The magnetizing inductors may be magnetic coupled inductors (three phase), it may be three single inductors, or it may be fully integrated in the transformer device.

Test Results

Figure 8:
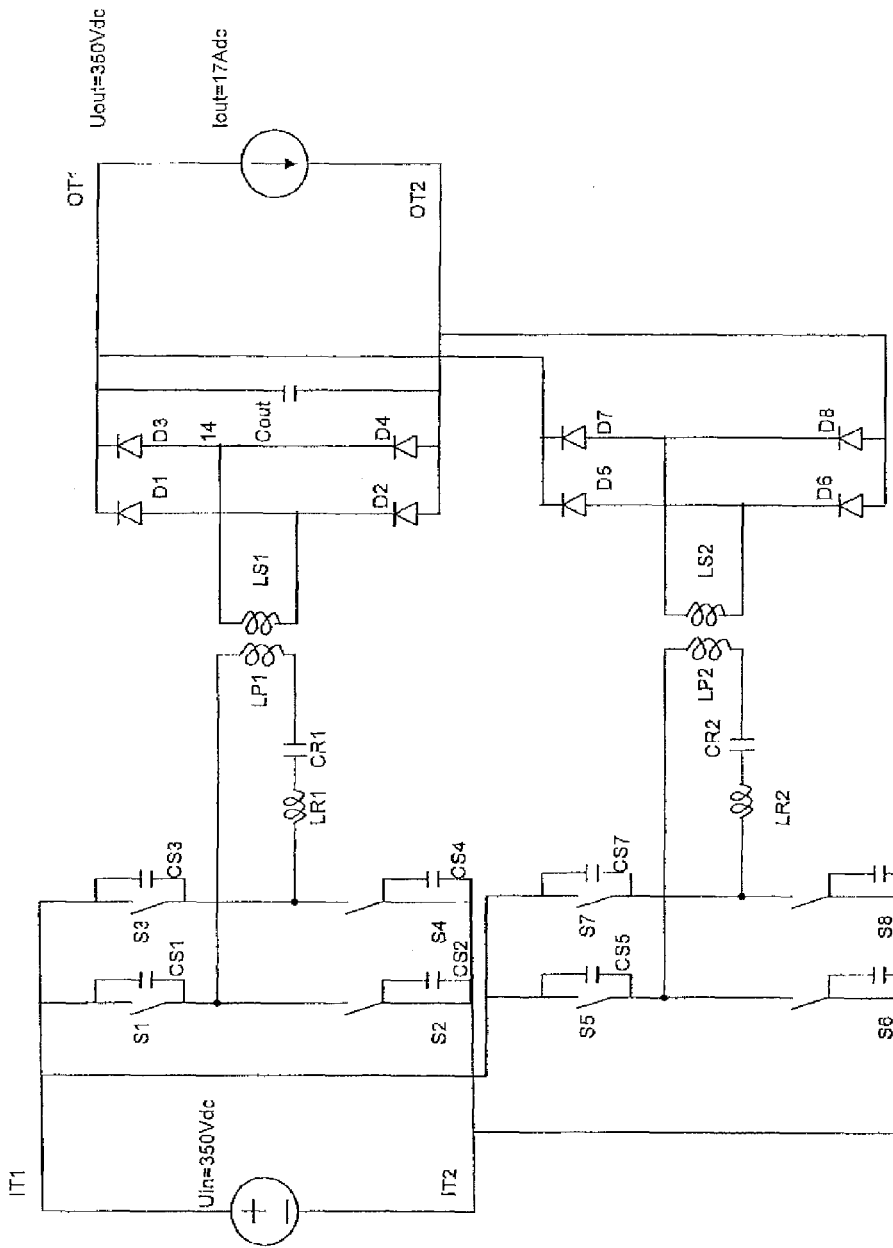
FIG. 8 is an illustration of a prior art converter typically used in such applications, comprising two series resonant LLC converters in parallel phase shifted 90 degrees.

As mentioned in the introduction, the most common prior art circuit for such types of resonant DC/DC converters are two series resonant LLC converters, as illustrated in FIG. 8.

A simulation of the prior art circuit in FIG. 8 has been performed by using LTspice from Linear Technology (http://www.linear.com). In the simulation, the input and output values for the simulation were Uout-350 Vdc, Iout=17 Adc, Uin=350 Vdc.

Figure 9A:
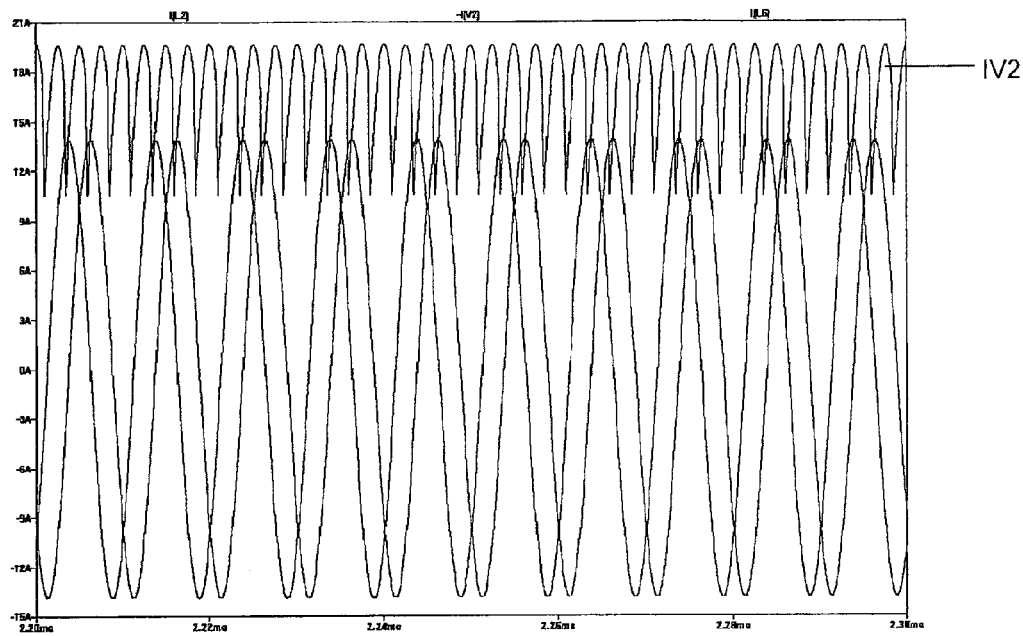
FIG. 9a shows the results of a simulation of the circuit in FIG. 2.

The result of the simulation is shown in FIG. 9a. Here it is shown that the input ripple current IV2 here has a peak-to-peak value of approximately 10 A.

A corresponding simulation of the circuit shown in FIG. 3 was also performed in the same way as above, with the same input and output values.

Figure 9B:
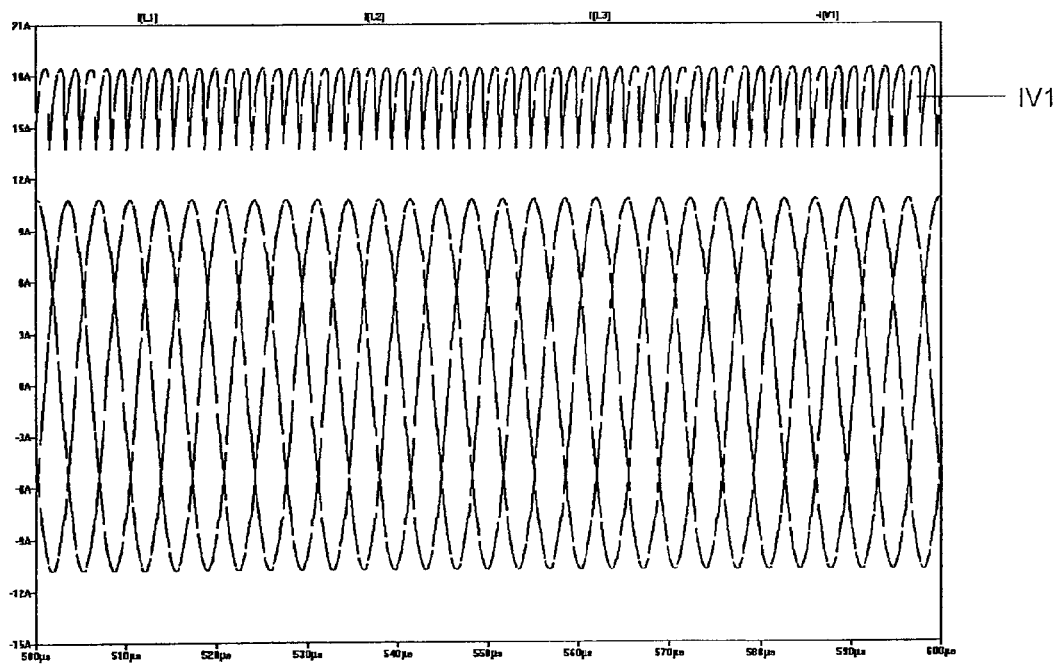
FIG. 9b shows the results of a simulation of the circuit in FIG. 3.

The result of this simulation is shown in FIG. 9b. From the results of FIG. 9b the input ripple current IV1 here has a peak-to-peak value of approximately 5 A.

Consequently, the input ripple current has been clearly reduced for the present invention compared with prior art.

Moreover, it can be seen that the converter of FIG. 3 has a lot fewer components than the converter of FIG. 8. According to the three phase design of the resonant tank device and transformer device, the current of each branch is decreased, which reduces the losses.

It is also achieved a circuit with large flexibility with respect to the controllable ratio of the input voltage/output voltage. The low current through the resonant tank makes it well suited for a high impedance resonant tank. In addition, reconfiguration of the transformer device and resonant tank device for example from a delta-delta-configuration to a delta-star-configuration for low input voltages improves this controllable ratio further.

The low ripple current also eliminates the need for electrolytic capacitors.

It should be noted that the high efficiency may be increased further at low power by stop switching one of the three branches on the primary side, for example by keeping the switches S5 and S6 constant off. The converter will then act as a quasi full bridge resonant converter.

The invention claimed is:
1. A resonant circuit comprising:
  a first resonant circuit input node, a second resonant circuit input node, and a third resonant circuit input node;
  a first resonant circuit output node, a second resonant circuit output node, and a third resonant circuit output node;
  a transformer device comprising:
    a first primary winding, a second primary winding, and a third primary winding;
    a first secondary winding, a second secondary winding, and a third secondary winding, wherein the first, second, and third primary windings are magnetically connected to the first, second, and third secondary windings, wherein the first, second, and third secondary windings are connected to the first, second, and third resonant circuit output nodes;

a first resonant tank device, a second resonant tank device, and a third resonant tank device each connected between the respective first, second, and third resonant circuit input nodes and the respective first, second, and third primary windings; and a first transformer switching device, a second transformer switching device, and a third transformer switching device arranged to connect the first, second, and third secondary windings in one of the delta-configuration and a star-configuration, wherein the first, second, and third primary windings together with the first, second, and third resonant tank devices are configured in a delta-configuration, wherein the first resonant tank device comprises a first resonant inductor and a first resonant capacitor such that the first resonant inductor, the first resonant capacitor, and the first primary winding are directly connected in series to the first resonant circuit input node and the third resonant circuit input node, wherein the second resonant tank device comprises a second resonant inductor and a second resonant capacitor such that the second resonant inductor, the second resonant capacitor, and the second primary winding are directly connected in series to the second resonant circuit input node and the first resonant circuit input node, and wherein the third resonant tank device comprises a third resonant inductor and a third resonant capacitor such that the third resonant inductor, the third resonant capacitor, and the third primary winding are directly connected in series to the third resonant circuit input node and the second resonant circuit input node.

2. The resonant circuit according to claim 1, wherein each of the first, second, and third transformer switching devices comprise a first terminal, a common terminal, and a second terminal, wherein the common terminal of the first transformer switching device is connected to the second terminal of the second transformer switching device, the first terminal of the first transformer switching device is connected to the first resonant output node and the second terminal of the first transformer switching device is connected to the common terminal of the third transformer switching device, wherein the common terminal of the second transformer switching device is connected to the second terminal of the third transformer switching device, the first terminal of the second transformer switching device is connected to the second resonant circuit output node and the second terminal of the second transformer switching device is connected to the common terminal of the first transformer switching device, wherein the common terminal of the third transformer switching device is connected the second terminal of the first transformer switching device, the first terminal of the third transformer switching device is connected to the third resonant circuit output node and the second terminal of the third transformer switching device is connected to the common terminal of the second transformer switching device, wherein the first secondary winding is connected between the first and second terminals of the first transformer switching device, the second secondary winding is connected between the first and second terminals of the second transformer switching device and the third secondary winding is connected between the first and second terminals of the third transformer switching device, wherein the transformer device is connected in the delta-configuration when the first terminal of each of the first, second, and third transformer switching devices is connected to the respective common terminal of each of the first, second, and third transformer switching devices, and wherein the transformer device is connected in the star-configuration when the second terminal of each of the first, second, and third transformer switching devices is connected to the respective common terminal of each of the first, second, and third transformer switching devices.

3. The resonant circuit according to claim 1, wherein:

a first magnetic inductor is connected in parallel with the first primary winding;

a second magnetic inductor is connected in parallel with the second primary winding; and a third magnetic inductor is connected in parallel with the third primary winding.

4. A resonant DC-DC converter comprising:

a first input terminal and a second input terminal;

a first output terminal and a second output terminal;

a switching device connected between the first and second input terminals and a first resonant circuit input node, a second resonant circuit input node, and a third resonant circuit input node of a resonant circuit;

a rectifier device connected between a first resonant circuit output node, a second resonant circuit output node, and a third resonant circuit output node and the first and second output terminals;

wherein the resonant circuit comprises a transformer device comprising:

a first primary winding, a second primary winding, and a third primary winding;

a first secondary winding, a second secondary winding, and a third secondary winding, wherein the first, second, and third primary windings are magnetically connected to the first, second, and third secondary windings, and wherein the first, second, and third secondary windings are connected to the first, second, and third resonant circuit output nodes, wherein the resonant circuit comprises a first resonant tank device, a second resonant tank device, and a third resonant tank device each connected between the respective first, second, and third resonant circuit input nodes and the respective first, second, and third primary windings, wherein the first, second, and third primary windings together with the first, second, and third resonant tank devices are configured in a delta-configuration, wherein the first resonant tank device comprises a first resonant inductor and a first resonant capacitor such that the first resonant inductor, the first resonant capacitor, and the first primary winding are directly connected in series to the first resonant circuit input node and the third resonant circuit input node, wherein the second resonant tank device comprises a second resonant inductor and a second resonant capacitor such that the second resonant inductor, the second resonant capacitor, and the second primary winding are directly connected in series to the second resonant circuit input node and the first resonant circuit input node, and wherein the third resonant tank device comprises a third resonant inductor and a third resonant capacitor such that the third resonant inductor, the third resonant capacitor, and the third primary winding are directly connected in series to the third resonant circuit input node and the second resonant circuit input node.

5. The converter according to claim 4, further comprising a first transformer switching device, a second transformer switching device, and a third transformer switching device for connecting the first, second, and third secondary windings in one of the delta-configuration and a star-configuration.

6. The converter according to claim 5, wherein the switching device comprises six switching devices, wherein each switching device is connected between one of the first or second input terminals and one of the respective switch output nodes.

7. The converter according to claim 5, wherein the rectifier device comprises one of a diode rectifier or a synchronous rectifier.

8. The converter according to claim 4, wherein the switching device comprises six switching devices, wherein each switching device is connected between one of the first or second input terminals and one of the respective switch output nodes.

9. The converter according to claim 8, wherein the rectifier device comprises one of a diode rectifier or a synchronous rectifier.

10. The converter according to claim 4, wherein the rectifier device comprises one of a diode rectifier or a synchronous rectifier.

* * * * *